Patented Feb. 22, 1927.

1,618,266

UNITED STATES PATENT OFFICE.

JOSEPH BRESLAUER, OF GENEVA, SWITZERLAND, ASSIGNOR TO COMPAGNIE DE L'AZOTE ET DES FERTILISANTS S. A., OF GENEVA, SWITZERLAND, A SWISS COMPANY.

MANUFACTURE OF ALKALI-NITROGEN FERTILIZERS HAVING UREA AS THEIR BASE.

No Drawing. Application filed June 22, 1925, Serial No. 38,917, and in Switzerland June 26, 1924.

This invention relates to the manufacture from calcium cyanamide, of alkali nitrogen fertilizers having urea for their base.

Heretofore acids and acid catalyzers have been utilized for the preparation of cyanamide and its conversion into urea, in order to obviate the polymerization of the cyanamide, into the injurious dicyandiamide, for example, when working in an alkaline medium.

Moreover according to the work of Kruger and Grube, the polymerization of the cyanamide, for example, into dicyandiamide, reaches its maximum for a given concentration of the hydroxyl ions and then diminishes rapidly as the amount of hydroxyl ions increases.

According to the process forming the subject of this invention, alkali nitrogen fertilizers are made by converting the cyanamide into urea by caustic alkalis produced by double decomposition from salts of alkali metals with the free lime of the calcium cyanamide.

This double decomposition gives very strong bases which permit of working under conditions which are unfavourable for the polymerization of the cyanamide.

In order to carry this process into practice either salts of potassium or salts of sodium can be used. In the example given below, there are used, for example, salts of potassium such as, for example the sulphate of potassium, and there is obtained a mixed fertilizer containing in addition to urea, more especially carbonate of potassium.

The operation is as follows:

To a saturated solution of sulphate of potassium for example, there is added at temperatures between 30 and 120 degrees C. in small quantities raw commercial calcium cyanamide, the amount of which being reckoned so that the free lime of the calcium cyanamide corresponds in the maximum case to the acid radical of the sulphate of potassium. When all the cyanamide is introduced, the mixture is stirred during about a quarter of an hour and in order to separate the sulphate of lime formed, the solution is filtered. This solution, which contains caustic potash in addition to the potassium cyanamide, is then brought to the boiling point or to a higher temperature, for example, in an autoclave, in order to effect the complete conversion of the cyanamide into urea. The free caustic potash is then treated with a current of $CO_2$ so as to obtain potassium carbonate $K_2CO_3$, and this mixture of urea and $K_2CO_3$ is evaporated to dryness.

Instead of treating the solution with a current of $CO_2$ for example, after the complete conversion into urea, the solution can be treated in this manner directly after filtration; the solution thus obtained is then used to precipitate the lime of a fresh quantity of calcium cyanamide and becomes enriched in nitrogen.

The heating of the alkaline solution, can also be effected for example before the filtration, such heating being continued until the complete conversion of the cyanamide into urea is effected. The mixed fertilizer is thus obtained directly.

The resultant product forms a fertilizer which is very rich in fertilizing materials and has the advantage that the proportion of nitrogen relatively to the carbonate of potassium may be varied as desired within certain limits.

It will be understood that solutions consisting very largely or primarily of normal salts are to be used, and that the presence of acid salts sufficient to materially lessen or delay the attainment of the required hydroxyl ion concentration is to be avoided.

We claim:

1. A process of converting calcium cyanamid into urea which comprises, forming an alkaline solution of cyanamid by adding the calcium cyanamid to a solution of an alkali metal normal salt, and heating the resulting alkaline solution of cyanamid to form urea.

2. A process of converting calcium cyanamid into urea which comprises, forming an alkaline solution of cyanamid by the addition of the calcium cyanamid to a solution of a potassium normal salt, and heating the resulting alkaline solution of cyanamid to form urea.

3. A process of converting calcium cyanamid into urea which comprises, forming an alkaline solution of cyanamid by adding calcium cyanamid to a potassium sulphate solution, and heating the resulting solution of cyanamid and alkali to form urea.

4. A process of converting calcium cyanamid into urea which comprises, forming an alkaline solution of cyanamid by adding calcium cyanamid to a solution of an alkali metal normal salt, heating the resulting alkaline solution of cyanamid to form urea, and neutralizing the alkali with carbon dioxide.

5. A process of converting calcium cyanamid into urea which comprises, forming an alkaline solution of cyanamid by adding calcium cyanamid to a solution of a normal potassium salt of an acid forming an insoluble compound with calcium, removing the insoluble calcium compound, neutralizing the resulting alkaline solution with carbon dioxide, and adding calcium cyanamid to the resulting solution of alkali carbonate and cyanamid, and bringing said solution to a temperature sufficient to convert the cyanamid to urea.

6. A process of converting calcium cyanamid into urea which comprises, forming an alkaline solution of cyanamid by adding calcium cyanamid to a solution of potassium sulphate, the maximum quantity of calcium cyanamid being equivalent to the sulphate radical of the potassium sulphate, and heating the resulting solution to change the cyanamid to urea.

7. A process of converting calcium cyanamid into urea which comprises, adding calcium cyanamid to a solution of an alkali metal normal salt at a temperature between 30° C. and 120° C. to form an alkaline solution, heating the resulting alkaline solution of cyanamid at a boiling temperature or higher to change the cyanamid to urea, and neutralizing the resulting alkaline solution of cyanamid to urea.

8. A process of converting calcium cyanamid into urea which comprises forming an alkaline solution of cyanamid by adding calcium cyanamid to a solution of an alkali metal normal salt of an acid forming an insoluble compound with calcium, removing the insoluble calcium compound, neutralizing the resulting alkaline solution of cyanamid with carbon dioxide, adding additional calcium cyanamid to the resulting solution, and maintaining said solution at a temperature sufficient to transform said cyanamid solution into urea.

In testimony whereof I affix my signature.

JOSEPH BRESLAUER.